Jan. 31, 1933.   J. H. MORECROFT   1,895,812
ELECTRICAL MEASURING INSTRUMENT
Filed Dec. 24, 1930   2 Sheets—Sheet 1
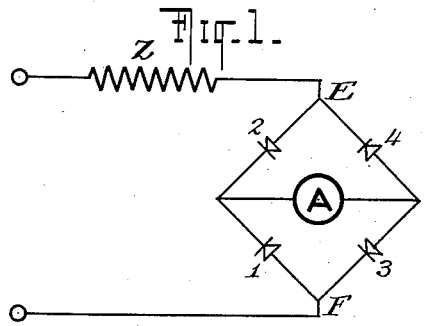
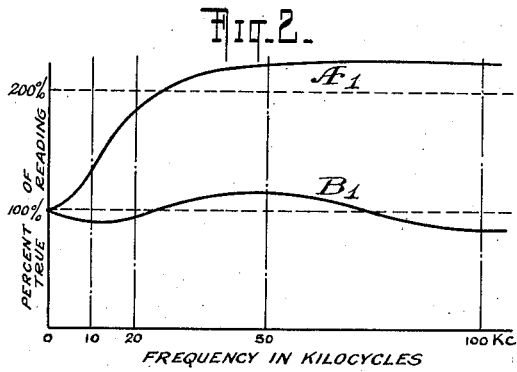
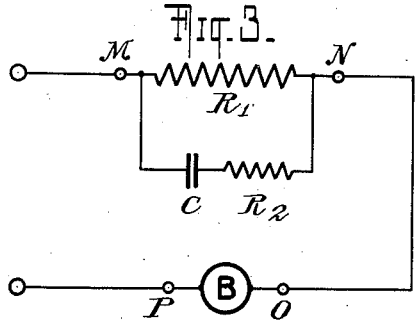
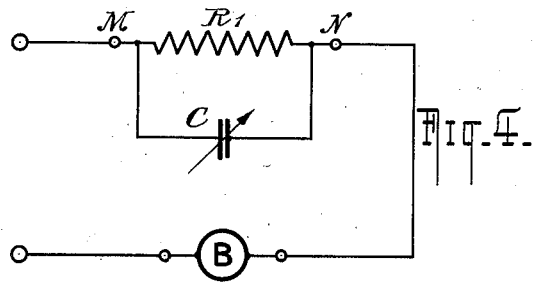
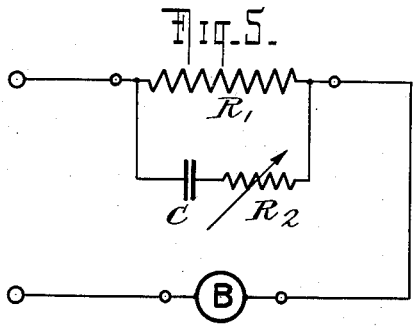
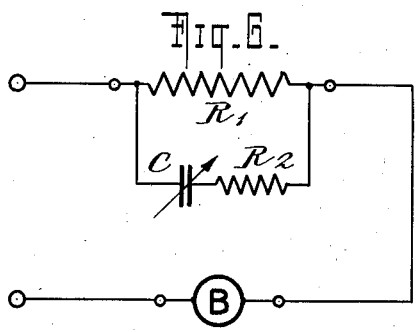
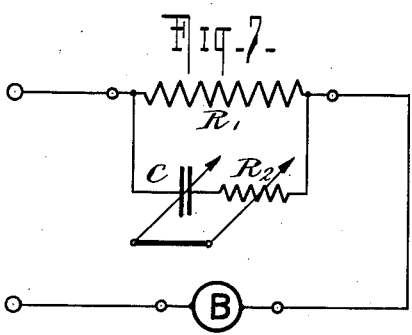
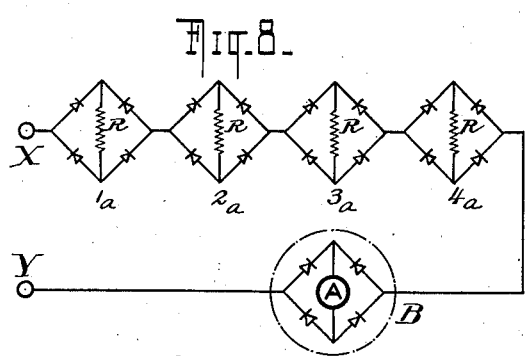
INVENTOR
John H. Morecroft
BY
Walter H. Pumphrey
ATTORNEY Jan. 31, 1933. J. H. MORECROFT 1,895,812
ELECTRICAL MEASURING INSTRUMENT
Filed Dec. 24, 1930 2 Sheets-Sheet 2

INVENTOR
John H. Morecroft
BY
Walter H. Pumphrey
ATTORNEY

Patented Jan. 31, 1933

1,895,812

UNITED STATES PATENT OFFICE

JOHN H. MORECROFT, OF PALISADE, NEW JERSEY

ELECTRICAL MEASURING INSTRUMENT

Application filed December 24, 1930. Serial No. 504,607.

This invention relates to improvements in certain types of electrical measuring instruments used for measuring current or voltages in an alternating current circuit.

In a meter for this purpose, recently put on the market, great sensitivity has been gained by using for the actual meter itself, a direct current meter of the permanent magnet type, which operates from the alternating current supply through rectifiers of some kind or other.

I have found that in meters of this class, very great error occurs in the indications of the meter when the frequency of the alternating current exceeds a certain value and in order to eliminate such error, it is the purpose of the present invention to provide a circuit arrangement whereby the meter may be used over a wide frequency range without incurring serious error in calibration.

In the accompanying drawings, I have shown various circuit arrangements suitable for carrying my invention into effect, but do not wish to be understood as intending to limit myself to the same, as various changes may be made therein without departing from the spirit and scope of the invention, as outlined in the appended claims.

Figure 9:
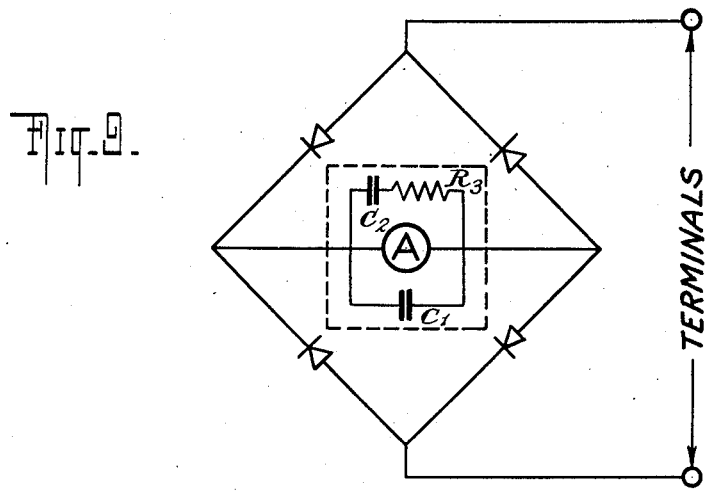

In the drawings, I have shown in Fig. 1, a circuit arrangement for one of these meters; in Fig. 2, I have shown calibration curves for the meter as put on the market by the manufacturer and after the meter has been improved according to one embodiment of my invention; in Fig. 3, I have shown a circuit arrangement which results in the improvement shown by the curves in Fig. 2; in Figs. 4, 5, 6 and 7, I have shown a special application of my idea in which one or more elements of the circuit may be changed to improve the performance of the meter for any special set of conditions; and in Fig. 8, I have shown an arrangement which automatically produces the beneficial results obtained by the indicated manual adjustments of Figs. 4 to 7. In Fig. 9, I have shown an improved arrangement of the rectifier bridge-D. C. meter combination, and in Fig. 10 I have shown a circuit arrangement for increasing the voltage range of the circuit of Fig. 9.

Referring now to the drawings, there is shown in Fig. 1, four rectifiers, 1, 2, 3, 4, connected in bridge formation, and a sensitive direct current ammeter A, of the d'Arsonval type. It may be seen that when point E is positive with respect to point F, current flows through rectifier 2, meter A and rectifier 3. During the next alternation of the current, when F is positive with respect to E, current flows through rectifier 1, meter A and rectifier 4. Thus current flows through meter A in the same direction for both polarities of voltage across point E—F and so the direct current meter A is made to read on an alternating current supply. This combination of meter A with the bridge of rectifiers, constitutes one form of the alternating current meter referred to throughout the specification and claims.

This alternating current meter is good for about one volt range, when copper oxide rectifiers are used; to increase its voltage range, the series impedance Z has heretofore been used. This meter shows great inaccuracy when the frequency of the alternating voltage being measured is increased beyond a rather low value.

In Fig. 2, I have shown how this meter responds at different frequencies from low values up to 100,000 cycles. It is seen that such a meter reads over 100 per cent high for frequencies higher than about 10,000 cycles, making it entirely useless as a voltage measuring device for any but the low frequencies.

In other circuit arrangements sometimes employed, I have found the meters to read low as the frequency is increased.

As a result of a somewhat extended use of the meter, I have discovered the cause of the inaccuracy in the reading, and by applying my corrective circuit, I have been able to change the calibration curve of a given meter from curve $A_1$ of Fig. 2 to curve $B_1$ of Fig. 2.

The reason for the inaccuracy of the meter appears when the rectifier-D. C. meter combination is tested by itself, without the series impedance; it shows a leading characteristic drawing a current which leads the impressed voltage very much, especially at the higher frequencies. Furthermore, I have found that the impedance of the rectifier-meter combination changes with the value of the impressed voltage, even at a fixed frequency.

Now referring to Fig. 1, it will be evident to those skilled in the art that if the electrical characteristics of the rectifier-meter combination change with frequency, and with voltage, the electrical characteristics of the series impedance Z must change in the same manner, if the meter readings are to be accurate under various conditions of voltage and frequency.

Herein lies the essence of my invention, which consists in using for the series impedance Z, a circuit so designed and built, that it varies its electrical characteristics in approximately the same manner as does the rectifier-meter combination.

By using the arrangement of Fig. 3, I have been able to effect great improvements in the accuracy of the meter. The resistance $R_1$ is chosen of the right value to make the meter read accurately at low frequencies; for one of the meters I have tested, having a five volt range, the required value of $R_1$ was 10,800 ohms. The resistance is of the non-reactive type.

The shunt circuit C—$R_2$ is of practically no effect at the low frequencies, due to the high reactance of the condenser C. By choosing the right value of C, the meter may be made to read right at any specified frequency; the amount of capacity required depends upon the frequency and the value of resistance used for $R_2$. By selecting suitable relative values of C and $R_2$, it is possible to make the meter read approximately correct over a wide frequency range. Thus by using 6000 ohms for $R_2$ and 500 micromicrofarads for C, the meter gave the calibration curve shown at B in Fig. 2. The very great improvement over the performance of the meter, previously referred to as having been recently put on the market, is at once evident.

With further reference to Fig. 3, I desire the impedance between point M—N to vary with frequency and with voltage as does the impedance between points O—P. This latter is the impedance of the rectifier bridge meter combination. Whereas I have found it possible to make the impedance between points M—N vary, with frequency, in almost the same manner, as does the impedance between points O—P, it does not vary with the impressed voltage; this deficiency in performance can be remedied, if desired, by another circuit arrangement described later.

If it is desired to have the meter read more accurately, at any one frequency, than is shown by curve $B_1$ of Fig. 2, I have found that any one of the schemes shown in Figs. 4, 5, 6 and 7 is suitable. The calibration of the meter at any given frequency (in the higher range of frequencies) can be made accurate by suitably varying either the capacity C or the resistance $R_2$, of these combinations. It is also possible to vary $R_1$, but this I have found inadvisable, as it disturbs the accuracy of the calibration at the low frequencies.

The simplest one of these adjustable circuits is shown in Fig. 4. The condenser C makes it possible to adjust the meter to an accurate reading for any frequency, a different capacity being required for each frequency. I have found that with the meters I have tested, a variation in C from .0015 microfarad down to .0004 microfarad is sufficient to make the meter read correctly for any frequency between 100 cycles and 150,000 cycles. This variable condenser C can be calibrated in terms of frequency instead of capacity; the user then adjusts this condenser to the frequency at which he desires to use the meter.

In Figs. 5, 6 and 7, I have shows either C, $R_2$, or both of them adjustable; in Fig. 7 they are shown adjustable from a common control.

All of the schemes thus far described, have the defect that the electrical characteristics of the series impedence do not vary with the impressed voltage, as do those of the rectifier-meter combination. In Fig. 8, I have shown an arrangement in which this defficiency is overcome. Here the series impedance is made up of a series of rectifier bridges, similar to that used with the direct current meter; instead of having a meter connected across the rectifier bridge, they have an impedance R, which has the same electrical characteristics as the direct current meter. In other words, the sections $1_a$, $2_a$, $3_a$, $4_a$ of the impedance in Fig. 8 have the same electrical characteristics as the rectifier-meter combination B of the figure.

It will be seen that by this arrangement, the meter B always gets its proportionate share of the voltage impressed; in the arrangement shown in Fig. 8, the meter B receives one-fifth of the voltage impressed on the terminals X—Y. For the type of copper oxide rectifiers I have tested, the arrangement of Fig. 8 would be suitable for a voltmeter of 5 volts range.

I have further found that the accuracy of the meter can be much improved by changing the rectifier bridge-meter combination, as shown in Fig. 9. Here I have shown connected in parallel with the direct current meter A, an electrical net work which very much reduces the frequency error of the meter. The function of this network, having in one branch the condenser $C_1$, and in the other branch the condenser $C_2$ in series with resistance $R_3$, is to maintain a fixed ratio between the average value of the current flowing through the coil of meter A, and the magnitude of the alternating voltage impressed upon the terminals.

The rectifier bridge-meter combination, as available on the market, shows a ratio of average current through the meter coil, to alternating voltage impressed on the terminals (Fig. 9), which varies as much as 10 per cent in the frequency range from 100 cycles to 100 kilocycles. This probably accounts for the departure of curve $B_1$ (Fig. 2) from the desired straight line calibration.

I have found that by using the extra circuits around the meter A, as shown in Fig. 9, that the meter will read accurately, to within about 1%, for a frequency range from 100 cycles to 100 kilocycles per second. For the meter I tested, a value of $C_1$ equal to .001 microfarad, a value of $C_2$ of .04 microfarad and a resistance $R_3$ of 1000 ohms, proved satisfactory.

The most suitable values for these quantities undoubtedly depends upon the characteristics of the rectifiers used; also upon their arrangement in the circuit. The values given above are for a meter using small copper oxide rectifiers arranged in a bridge circuit.

Other rectifiers, arranged otherwise than in a bridge circuit, would require different values.

Whereas I have shown in Fig. 9, two circuits in shunt with meter A, it is not my intention to limit myself to this arrangement. Beneficial results can be obtained with only one of the circuits, and somewhat better results can be obtained with a three path network across the meter A. In general, the wider the frequency range to be covered the more complex must be the shunting network for a given accuracy of calibration.

Figure 10:
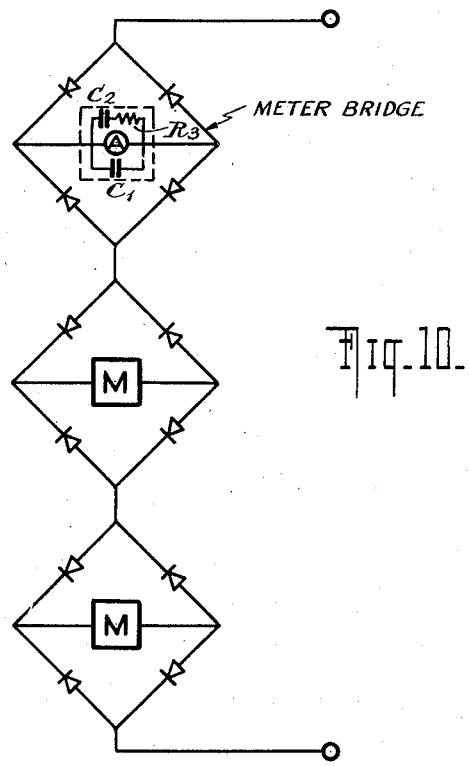

In Fig. 10, I have shown the proper arrangement for using my invention in its preferred form, for a meter of about three volts range. The added bridge of rectifiers are preferably of the same type as those used for the bridge containing meter A. The circuits marked M, M, in the additional bridges should have approximately the same electrical characteristics as the circuit included in the dashed line rectangles of the bridge marked "Meter bridge" of Fig. 10.

For meters of greater range than about three volts, more series impedance of proper characteristics must be added in the meter circuit. This can well be done by multiplying the arrangement of Fig. 10, using one extra bridge unit for each extra volt of scale range desired. In case other rectifiers than copper oxide are used, more or less of these series bridge units will be necessary, more units as the useful voltage range of the rectifier is less.

In place of the net works shown in the various figures, it is theoretically possible to so wind the resistance $R_1$ of Figs. 3-7, and the coil of meter A of Fig. 9, that the distributed capacity takes the place of the condensers shown in these figures, but I prefer to use actual condensers as their precise determination is easier to obtain. However, my inventive thought covers the use of such circuits having the proper amount of distributed capacity, properly disposed, as well as the specific circuit arrangements shown in the various figures of the drawings.

Whereas I have confined my discussion and diagrams to the type of meter which uses a bridge arrangement of rectifiers, it will be understood that my inventive idea may be applied to meters of the rectifier type, whether the bridge connection is used or not.

Having thus described my invention, what I claim is:

1. In an alternating current meter consisting of a bridge of rectifiers and a direct current meter, an electrical network for extending the voltage range of the meter, said network consisting of a set of rectifier bridges similar to that used with the direct current meter, these extra bridges being provided with impedances disposed with respect to their rectifiers as is the meter with respect to its rectifiers, said impedances being of such nature that their resistances and reactances vary with respect to changes in frequency or voltage in the same manner as does the impedance of the direct current meter itself.

2. In an alternating current meter of the rectifier-direct current meter type employing a moving coil, an electrical network in parallel with the moving coil of the direct current meter, said network being so proportioned that the numerical ratio of the average current through said coil to the voltage impressed upon the alternating current meter is substantially independent of the frequency of the impressed voltage.

3. In an alternating current meter containing a rectifier-direct current meter unit employing a moving coil, the combination of an electrical network in series with the rectifier-meter unit and another network in parallel with the moving coil of the direct current meter, said networks being so proportioned as to maintain a substantially constant ratio between the average value of the current in said moving coil and the voltage impressed upon the terminals of the alternating current meter, irrespective of the frequency of said impressed voltage.

JOHN H. MORECROFT.